(12) United States Patent
Douglas

(10) Patent No.: US 8,216,650 B2
(45) Date of Patent: Jul. 10, 2012

(54) PROTECTIVE AND DECORATIVE ORNAMENT FOR A VEHICLE

(76) Inventor: Joseph S. Douglas, Jamaica, NY (US)

( * ) Notice: Subject to any disclaimer, the term of this patent is extended or adjusted under 35 U.S.C. 154(b) by 590 days.

(21) Appl. No.: 12/409,243

(22) Filed: Mar. 23, 2009

(65) Prior Publication Data

US 2010/0239791 A1    Sep. 23, 2010

(51) Int. Cl.
- B60R 13/00 (2006.01)
- B32B 3/02 (2006.01)
- B32B 3/06 (2006.01)
- B05D 1/14 (2006.01)
- B60J 7/20 (2006.01)
- B65D 65/02 (2006.01)

(52) U.S. Cl. ............... 428/31; 428/85; 428/90; 428/99; 428/100; 428/101; 296/136.01; 296/136.1; 296/136.12; 150/166

(58) Field of Classification Search .............. 428/31, 428/85, 90, 99, 100, 101; 296/136.1, 136.12, 296/136.01; 150/166

See application file for complete search history.

(56) References Cited

U.S. PATENT DOCUMENTS

| | | | |
|---|---|---|---|
| 5,056,817 A | 10/1991 | Fuller | |
| 5,547,734 A | 8/1996 | Tusch | |
| 5,944,347 A | 8/1999 | Pechman | |
| 6,017,079 A | 1/2000 | Warner | |
| 6,217,958 B1 | 4/2001 | Blyden et al. | |
| 6,220,648 B1 | 4/2001 | Daniel | |
| 6,241,303 B1 | 6/2001 | Yee | |
| 6,595,575 B2 | 7/2003 | Morris | |
| 2002/0145305 A1 | 10/2002 | Bond | |
| 2004/0074577 A1 | 4/2004 | Tavelli et al. | |
| 2004/0189042 A1 | 9/2004 | Jarrard et al. | |
| 2005/0280283 A1 | 12/2005 | Douglas | |

FOREIGN PATENT DOCUMENTS

WO    WO 96/34777    11/1996

Primary Examiner — Gordon R Baldwin
(74) Attorney, Agent, or Firm — Fish & Richardson P.C.

(57) ABSTRACT

A protective and decorative ornament that remains substantially in place on a vehicle's outer surface under substantially all vehicle operating conditions. The ornament includes a top decorative layer, upper and lower foam layers beneath the top layer, fastening members that extend outward from at least two edges thereof, a weighted element between the upper and lower foam layers and proximate an edge that does not include a fastening member, a substantially rigid element beneath the lower foam layer, and a substantially smooth bottom layer coupled to contact the vehicle's surface.

18 Claims, 5 Drawing Sheets

PROTECTIVE AND DECORATIVE ORNAMENT FOR A VEHICLE

FIELD OF THE INVENTION

This disclosure relates to an ornament for a vehicle and, more particularly, to a protective and decorative ornament for a vehicle.

BACKGROUND

Vehicles, such as automobiles, are often a reflection of the owner's personality, taste and style. Automobiles are available in a variety of styles, colors, sizes, etc. to accommodate the various individual tastes.

SUMMARY OF THE INVENTION

In one aspect, an apparatus includes a top layer with an upper surface that is decorative, a substantially planar upper foam layer beneath and coupled to the fabric layer, a substantially planar lower foam layer beneath the upper foam layer and fastening members coupled to at least one of the upper or lower foam layer and extended outward from at least two edges thereof. Each fastening member is adapted to engage a respective portion of a vehicle's body to hold the apparatus in place. A weighted element is between the upper and lower foam layers and proximate an edge of the upper and lower foam layers that does not include a fastening member. A substantially rigid element beneath the lower foam layer and coupled to the top layer at peripheral edges thereof. A substantially smooth bottom layer coupled to a lower surface of the substantially rigid element. In a typical implementation, the apparatus adapted to be fastened to an outer surface of the vehicle.

In some embodiments, the apparatus includes a securing device (e.g., a t-pin) extended through the upper and lower foam layers and configured to urge the upper and lower foam layers towards one another. The securing device, however, typically is not extended through the top layer. This helps make the top layer, which is decorative, more visually appealing. Since the securing device does not extend through the top layer of the ornament, it typically is relatively easy to remove and change the top layer.

The upper and lower foam layers, in some implementations, respectively include substantially stiff plastic material (e.g., polyurethane, polyvinylchloride or polyester) having voids.

According to certain embodiments, the substantially smooth bottom layer is a fusible interface, heat-fused to the substantially rigid layer.

The weighted element can include a first portion substantially parallel to the edge of the foam layer that does not include the fastening member and a second portion that extends perpendicularly from the first portion substantially toward an edge of the foam layer opposite the edge that does not include the fastening member. For example, the weighted element may be substantially E-shaped.

In some embodiments, the weighted element material can be metal, wood, plastic or a combination of those materials. The weighted element can be sized and positioned so that, when the apparatus is coupled to the vehicle, the contours of the weighted element substantially follow the contours of the automobile beneath the apparatus.

Typically, the fusible material is non-magnetic.

In some implementations, the fastening elements include tuck flaps, hanger strapping, nylon, wire cable, hooks, loop and hook or other devices for fastening the ornament in place.

The top layer may include, for example, textured material that extends vertically out of a horizontal plane of the decorative upper surface. Such material may be, for example, fur or fur-like material. The apparatus is generally configured so that it can be secured to a vehicle in such a manner that the vehicle can be driven without substantial obstruction of the driver's view.

In another aspect, an apparatus is adapted to be fastened to an outer surface of the vehicle. The apparatus includes a top layer with an upper surface that is decorative, a substantially planar upper foam layer beneath and coupled to the fabric layer, a substantially planar lower foam layer beneath the upper foam layer, a weighted element between the upper and lower foam layers and fastening members coupled to at least one of the upper or lower foam layer and extended outward from at least two edges thereof, each fastening member adapted to engage a respective portion of a vehicle's body to hold the apparatus in place.

Certain embodiments include a substantially rigid layer beneath the lower foam layer and a substantially non-magnetic, fusible interface beneath and heat-fused to the lower foam layer.

The weighted element between the upper and lower foam layers typically is located proximate an edge of the upper and lower foam layers that does not include a fastening member.

A securing device (e.g., a t-pin) can be provided to extend through the upper foam layer and the lower foam layer to urge the upper foam layer and the lower foam layer towards one another, wherein the securing device does not extend through the top layer.

In some implementations, the upper and lower foam layers include substantially stiff plastic material having voids. The plastic material may be, for example, polyurethane, polyvinylchloride or polyester.

According to certain embodiments, the weighted element includes a first portion extended substantially parallel to the edge of the foam layer that does not include the fastening member and a second portion that extends perpendicularly from the first portion substantially toward an edge of the foam layer opposite the edge that does not include the fastening member.

In some implementations, one or more of the following advantages are present.

For example, a decorative and protective ornament is provided that can be secured to a vehicle's outer surface in a manner that helps to ensure that the ornament stays in place, with relative security, under all or most vehicle operating conditions.

The ornament can protect a surface and/or surfaces of a vehicle from scratches, mars, and/or dents. The ornament also allows an individual to personalize a vehicle. The ornament may also be used to deter the theft of a vehicle because of the individual characterization and/or ornamentation the present invention provides a vehicle. For example, a vehicle employing the ornament could be readily identifiable by authorities if stolen. The possible combinations of different materials, such as for example, fabric patterns, fabric colors, fabric cut, fabric lengths, and fabric textures coupled with the various make and model possibilities provides a great many combinations and permutations such that any number of vehicles employing the present invention would still be individual and distinct from each other.

The ornament also can foster a personal bond that a vehicle owner feels with his or her vehicle. The ornament can be custom cut to conform to the specific contours of the vehicle as well as be further personalized with, for example but not by way of limitations written characters, such as an expression, the driver's name, corporate slogan, country and/or city of origin, to match that of the language found on a vanity license plate, company name, trademark, trade name as well as cartoon characters and/or other expressive designs. The ornament can be used to announce and/or promote a business, product and/or service.

The ornament relates to accessories made for the protection of a vehicle surface and/or surfaces, and in particular to the protection of at least select regions of a vehicle's hood, fender and/or front or rear ends. The ornament has virtually no unsightly attachments or adhesives that would come in direct contact with a vehicle's surface and possibly mar or leave any residue on the vehicle. A series of hooks, flaps and/or straps made of, for example and not by way of limitation, plastic, metal, nylon, and/or cables provide tension and anchor the present invention to the vehicle. Weights also can be added for stability and to insure that the present invention stays in communication with the surface contours on which it is placed. These hooks, flaps and/or straps can provide a measure of theft protection and/or prevention. For example, if the present invention is placed on the hood of a vehicle, then in order to remove it without damage, the hood of the vehicle would have to be unlatched. Hood locks are typically located inside the vehicle and can be protected by locking the doors of the vehicle when the vehicle is left unattended.

In general, Applicant has found that the ornament's weight plus its rigidity plus its tension contribute to its stability on the surface of an automobile.

Other features and advantages will be apparent from the description and drawings, and from the claims.

BRIEF DESCRIPTION OF THE DRAWINGS

Like reference numerals refer to like elements.

DETAILED DESCRIPTION OF THE DRAWINGS

Figure 1:
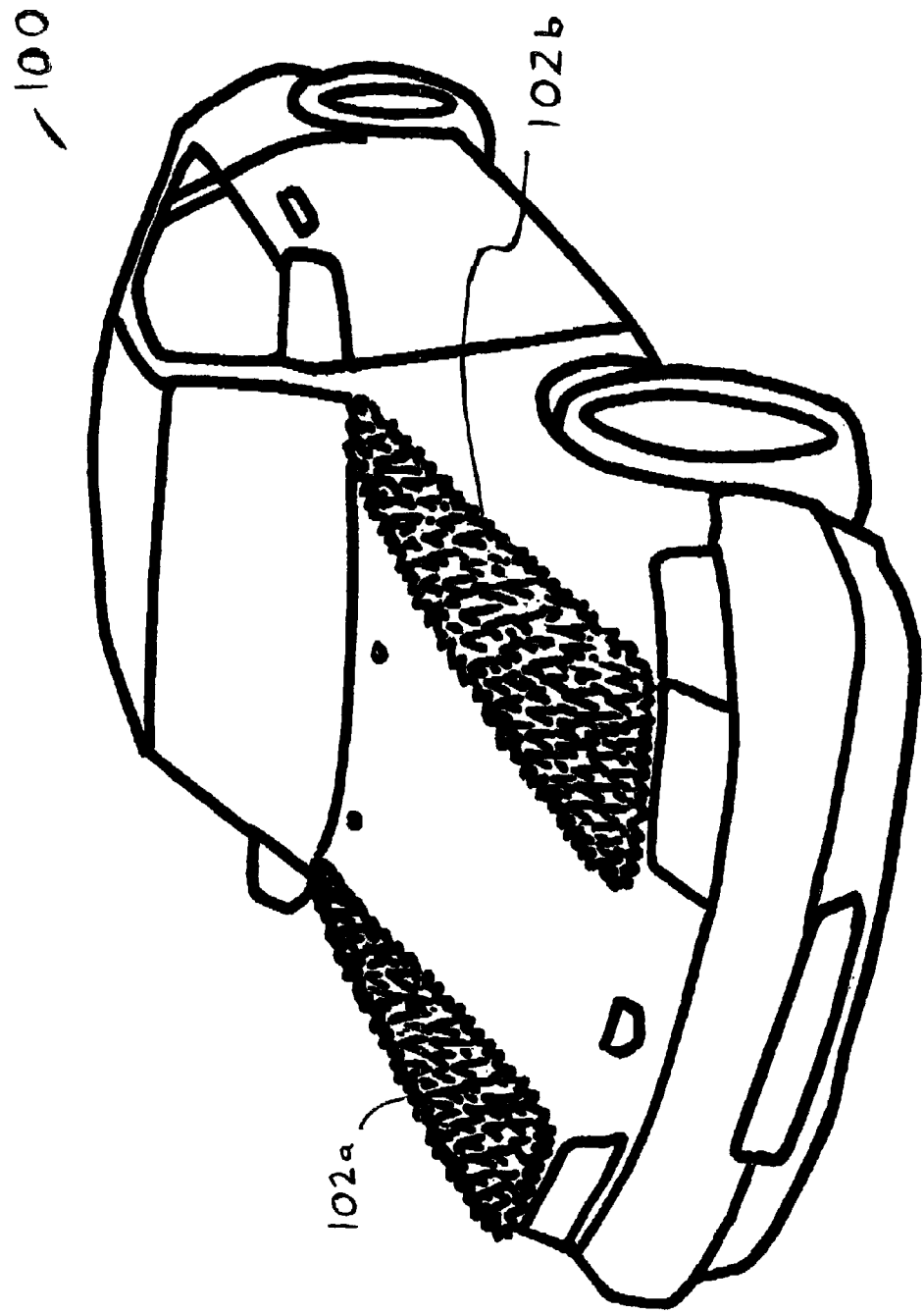
FIG. 1 is a perspective view of an automobile with a pair of exemplary ornaments attached to its hood.

FIG. 1 is a perspective view of an automobile 100 with two decorative and protective ornaments 102a, 102b attached to its hood.

In the illustrated implementation, the exposed, upper surfaces of the ornaments 102a, 102b include decorative fur-like material. The decorative surface gives the automobile a unique look and style. The decorative surface can have any pattern of colors and/or textures and any other decorative features that might be considered aesthetically pleasing.

Each ornament 102a, 102b is constructed and secured to the automobile in such a way that helps ensure that the ornament stays in place in a stable manner. More particularly, each ornament 102a, 102b is weighted, has a degree of rigidity, and is secured to the automobile 100 with sufficient amount of tension that the ornaments 102a, 102b maintain their respective positions on the hood of the car under all, or substantially all, vehicle operating conditions.

The ornaments 102a, 102b can be installed and removed with relative ease. This feature enables the owner of the automobile to swap out one ornament (or set of ornaments, e.g., ornaments 102a, 102b) with a different ornament (or set of ornaments). Accordingly, as the automobile 100 owner's style and taste evolves, the look and feel of the automobile can change accordingly.

Figure 2:
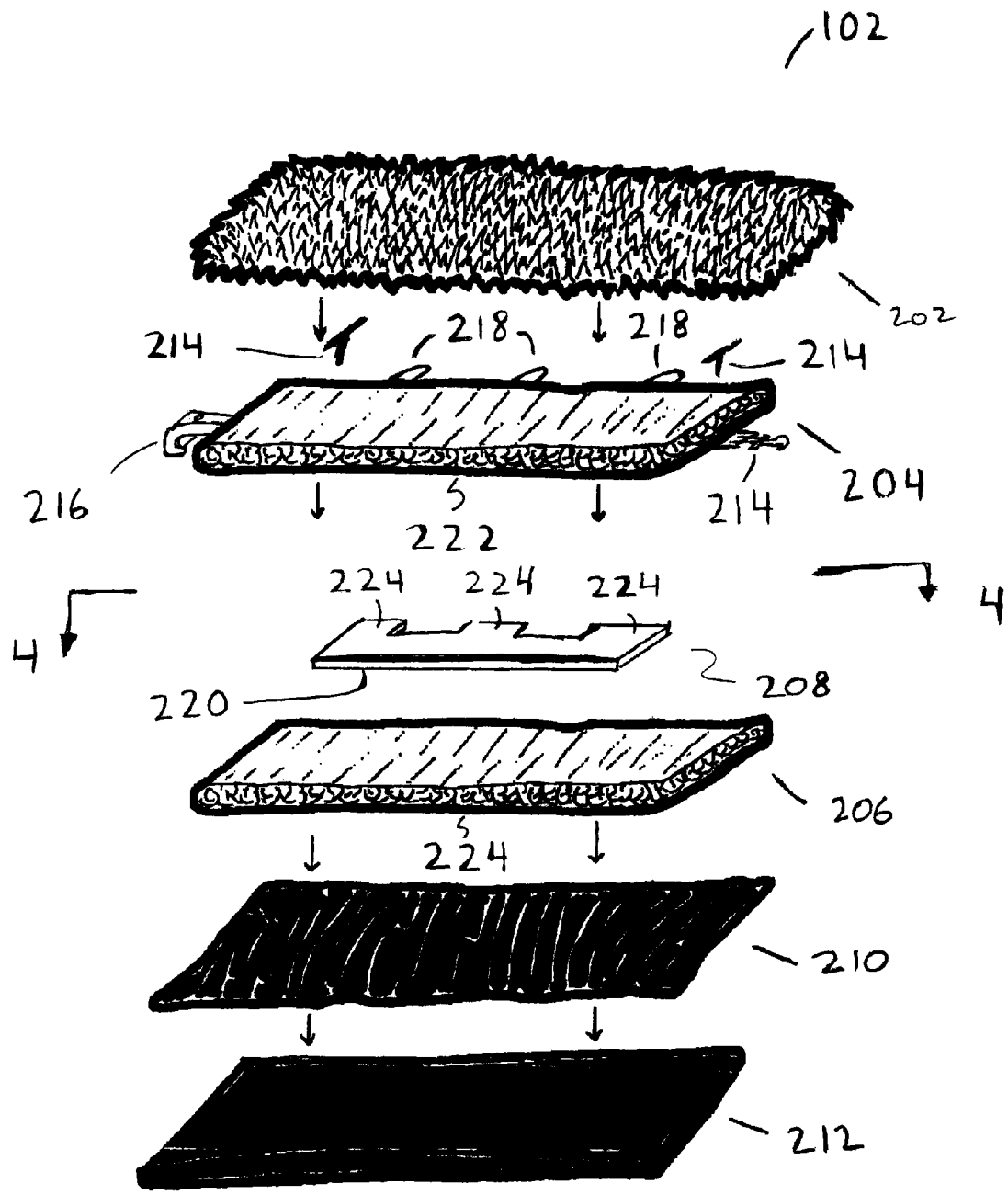
FIG. 2 is an exploded view of an exemplary ornament.

FIG. 2 is an exploded side view of an ornament 102, which is similar in structure to each of the ornaments 102a and 102b in FIG. 1.

The illustrated ornament 102 includes a top layer 202, upper 204 and lower 206 foam layers below the top layer 202, a weighted element 208 between the upper 204 and lower 206 foam layers, a rigid layer 210 below the lower foam layer, and a bottom layer 212. In the illustrated implementation, a pair of t-pins 214 extends, when assembled, through the upper 204 and lower 206 foam layers to hold these layers together. After the t-pins are pushed through these layers, the portion of each t-pin 214 that extends beyond the bottom of the lower foam layer 206 is bent to a direction substantially perpendicular to its piercing direction. This secures the t-pins 214 in place and helps urge the upper 204 and lower 206 foam layers together.

In addition to the t-pins 214, an adhesive material may be provided between any or all of the components in FIG. 2 to help hold the assembly together. A wide variety of adhesive materials may be suitable for this application. It is generally desirable that the adhesive material provide a secure bond between adjacent components (or portions of adjacent components) and maintain that bond under a variety of weather conditions and automotive operating conditions. It is also desirable that the adhesive material be at least somewhat resistant to degradation from exposure to moisture, cold, heat and other weather-related phenomena. One example of a suitable adhesive is an approximately 50:50 mixture of fabric glue (e.g., Magna Tac 809™ permanent adhesive, available from Beacon Adhesives, Inc. of Mount Vernon, N.Y.) and wood glue (e.g., Gorilla™ wood glue, available from Gorilla Glue, Inc. of Cincinnati, Ohio).

The top layer 202 typically is made of fabric and/or other flexible, durable material. To provide a decorative aspect, the upper surface can include, for example, long or short fibers, such as fur or any free flowing strand-like material, a variety of colors and/or materials to produce a decorative or artistic effect and other surface features to enhance its visible appeal.

The top layer 202 is generally weather-resistant. In some implementations, the top layer 202 is treated to be water repellent. The top layer 202 can be moisturized as well to help maintain its appearance and to avoid degradation due to prolonged exposure to the sun's rays or other environmental conditions.

The lower surface of the top layer 202 need not be and usually is not decorative. The lower surface of the top layer 202 typically is configured so that the adhesive material will be able to effectively hold the top layer 202 against the upper surface of the upper foam layer 204. Therefore, the lower surface of the top layer 202 typically is a relatively smooth surface, although it may be somewhat porous as well.

The upper 204 and lower 206 foam layers are substantially planar and porous. The porosity typically helps render these layers somewhat spongy and able, therefore, to absorb the energy of airborne debris that may come into contact with the ornament 102.

In a typical embodiment the upper and lower foam layers 204 have surfaces that are able to be effectively adhered to surfaces they come into contact with when assembled. Accordingly, it can be desirable that the degree of porosity not be so great that the adhesive material would seep into the pores and compromise its ability to adhere.

The thickness of the upper 204 and lower 206 foam layers can vary. In general, an ornament 102 with a thicker upper 204 or lower 206 foam layer may provide a greater degree of protection from airborne debris to the covered surfaces of the automobile than an ornament 102 with thinner upper 204 or lower 206 foam layer. The ornament 102 with a thicker upper 204 or lower 206 foam layer, however, generally weighs more, can be less flexible and harder for the owner to handle.

In general, the upper 204 and lower 206 foam layers each have a thickness that falls somewhere between about 1/8 inch and 1 1/2 inches. For example, their respective thicknesses may be about 1/8 inch, 1/4 inch, 3/8 inch, 1/2 inch, 5/8 inch, 3/4 inch, 7/8 inch, 1 inch, 1 1/8 inch, 1 1/4 inch, 1 3/8 inch or 1 1/2 inch. Other thicknesses are possible as well and the thickness of the upper foam layer 204 may be different than the thickness of the lower foam layer 206.

In some implementations, the upper and lower foam layers 206 have structures that are substantially identical to one another. This, of course, is not required.

Figure 3:
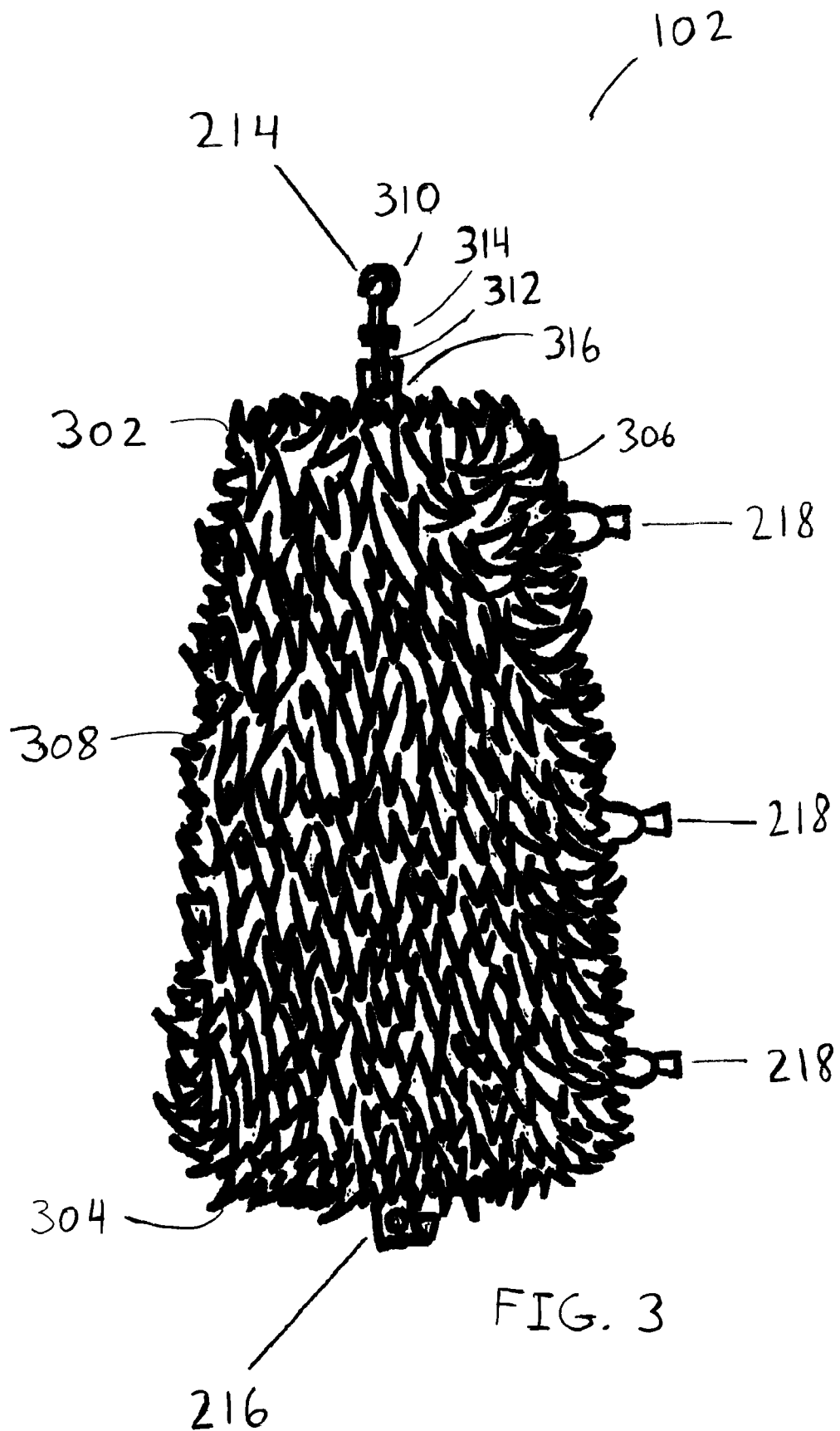
FIG. 3 is a plan view of an exemplary ornament.

In the illustrated implementation, fastening members, including a hook assembly 215, a rigid, curved strap 216 and three tuck flaps 218 are secured to the underside of upper foam layer 204. Referring now to FIG. 3, which shows the ornament 102 of FIG. 2 in an assembled state, the fastening members are arranged so that, when assembled, the hook 214 extends from a top edge 302 of the ornament 102, the rigid, curved strap 216 extends from a bottom edge 304 of the ornament 102 (opposite the top edge 302), and the three tuck flaps 212 extend from one of the side edges 306 of the ornament 102.

As is typical, the illustrated ornament 102 includes provisions for adjusting the lengthwise tension of the ornament 102 when it is coupled to an automobile's hood. This may be achieved in some implementations, by making one or more of the fastening elements on opposite sides of the ornament adjustable in length. In the illustrated implementation, for example, the hook 214 includes provisions that allow its length beyond the top edge 302 of the ornament 102 to be adjusted. This facilitates adjusting the tension of the ornament 102 when it is coupled to the hood of an automobile (e.g., automobile 100).

There are a variety ways that the length of the hook assembly (or other fastening element) could be adjustable. In the illustrated assembly, however, the hook assembly 215 includes a hook portion 310, a nut 314, a base rod 312 and a strap 316. The nut 314 is securely coupled to the hook portion 310 in a manner that enables the nut 314 to rotate relative to the hook portion, but prevents it from moving substantially in an axial direction relative to the hook portion 310. The nut 314 has internal threads that engage the base rod 312 so that when the nut 314 is rotated, the hook portion 310 and the base rod 312 move axially relative to one another. The base portion 312 is securely adhered to a strap 316. The strap 316 is securely adhered to the underside of the upper foam layer 204, for example, with an adhesive material.

The rigid, curved strap 216 is adhered to the underside of the upper foam layer 204 with adhesive material. The rigid, curved strap 216 is substantially rigid and curved to engage an edge of the automobile's hood. The rigid, curved strap 216 may be virtually any substantially rigid material, such as metal or plastic.

The tuck flaps 218 are flexible pieces of material that can be fit into the seam between the hood and a side panel of the automobile. In the illustrated implementation, three tuck flaps are provided approximately evenly spaced apart from one another.

In a typical implementation, the ornament 102 can be coupled to the hood of an automobile with its hook 204 coupled to a rear edge of the hood (i.e., the edge that is closest to the windshield), the metal strap 204 coupled to a forward edge of the hood and the tuck flaps 208 tucked into a side edge of the hood (e.g., between the hood and automobile's side panel). Once tucked, the tuck flaps 212 may be secured under the hood using, for example, hook-and-loop type connective material (e.g., Velcro™).

Referring again to FIG. 2, the weighted element 208 is sandwiched between the upper 204 and lower 206 foam layers. The illustrated weighted element 208 is substantially rigid, planar and "E"-shaped. The rigid element 214 can be made of, for example, Plexiglas, compressed wood, thin gauge sheet metal or any other material that has more weight than the other layers in FIG. 2.

In general, the weighted element 208 provides weight to the ornament 102, particularly along an unsecurable side of the ornament 102. In the implementation of FIG. 3, for example, the unsecurable side of the ornament 102 is the side 308 that does not include any fastening elements. The weighted element is designed and positioned to help keep the unsecured side of the ornament 102 from lifting off the hood of the automobile in an undesirable manner.

Figure 4:
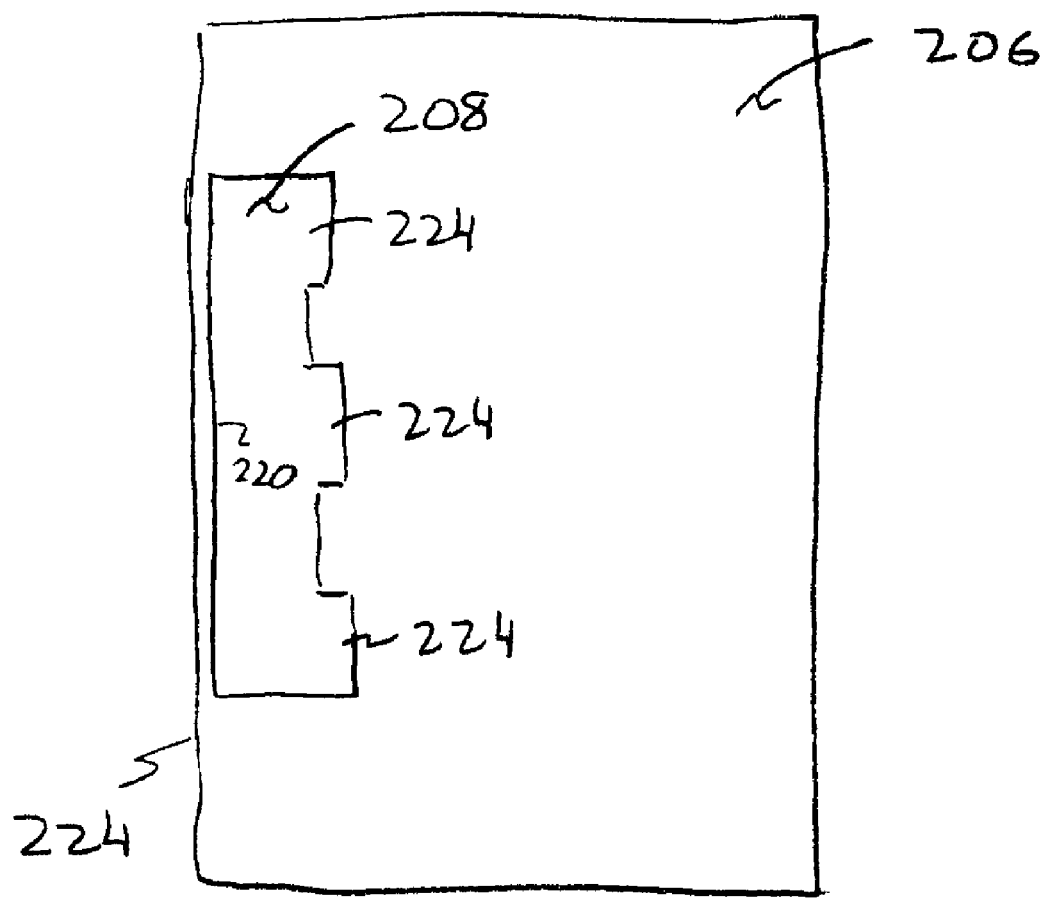
FIG. 4 is a cross-sectional view taken along lines 4-4 of FIG. 2.

In a typical implementation, the weighted element 208 would be positioned so that it is at least somewhat close to the unsecured side of the ornament 102. An example of this is shown in FIG. 4, which shows the weighted element's 208 position, when assembled, relative to the lower foam layer 206. In the illustrated example, the weighted element 208 is positioned so that its longest side 220 is about flush with the side 222 of the lower foam layer 204 that corresponds to the unsecurable side of the ornament 102. In a typical implementation, the upper foam layer 206 is approximately the same size as the lower foam layer 206 and is positioned so that its outer edges substantially align with the corresponding outer edges of the illustrated lower foam layer 204.

The distance between the longest side 220 of the weighted element 208 and the side 222 of the lower (and upper) foam layer 204 can vary between flush and about 2 inches. The distance could be, for example, zero inches, 1/4 inch, 1/2 inch, 3/4 inch, 1 inch, 1 1/4 inch, 1 1/2 inch, 1 3/4 inch or 2 inches.

The three legs 224 of the weighted element 208 extend across part of the lower foam layer's 206 width. In a typical implementation, such as the one shown in FIG. 4, the legs 224 extend only partially across the lower foam layer's 206 width. In a typical implementation, the legs extend less than halfway across the width. This helps to save material and associated costs.

As illustrated, the weighted element 208 is substantially centered in a lengthwise direction relative to the lower (and upper) foam layer 204. Although lengthwise centering is not required, it may be desirable to maximize the weighted element's 208 ability to prevent the unsecured side of the ornament from lifting off of the hood.

The illustrated weighted element 208 has a lengthwise dimension that is shorter than the corresponding lengthwise dimensions of the upper and lower foam layers. This is because the hood of automobiles typically is somewhat curved in from back to front and the rigid weighted element 208 (at least typically) is substantially flat. If the weighted element 208 were too long, this could cause problems with its ability to mate against the contoured hood. Therefore, the length of the weighted element 208 is short so that any differences between its contours and the hood's contours will have minimal, if any, negative impact. In general, however, as long as differences in contour are minimal, the weighted element may be made as long as possible. In a typical implementation, the lengthwise dimension of the weighted element 208 is between 30% and 90% of the lengthwise dimension of the upper and/or lower foam layers.

The thickness of the weighted element can vary based on the type and unit weight of the material used. However, the thickness typically is in the range of ⅛ inch to 1 inch.

Referring again to FIG. 2, beneath the lower foam layer 206, is a rigid layer 210. In some implementations, the rigid layer 210 is substantially more rigid than each of the top layer 202, upper 204 and lower 206 foam layers 204, and the bottom layer 212. It is generally desirable, however, that the rigid layer 210 has some degree of flexibility as well so that it can conform, at least partially, to the contours of the hood (or other surface), to which the ornament 102 is coupled. In the illustrated implementation, the rigid layer 210 has about the same length and width as the upper 204 and lower 206 foam layers.

The rigid layer 210 can be plastic, metal or any other substantially rigid material. In one embodiment, the rigid layer may be polyvinyl chloride or imitation leather. The rigid layer 210 can be sewed to the top layer 202 at peripheral edges thereof. This forms a substantially enclosed space containing the upper 204 and lower 206 foam layers and the weighted element 208. If sewn, openings are left to allow the fastening elements to extend outward from the substantially enclosed space.

The bottom layer 212 is beneath the rigid layer 210 in the illustrated implementation. The bottom layer 212 is the layer intended to directly contact the surface of the vehicle. As such, it is generally desirable that its lower surface be as smooth as possible. This can help avoid scratching the automobile's surface.

In some implementations, the bottom layer 212 is a fabric-like, fusible interface that can be ironed, for example, onto the bottom the of the rigid layer 210. The bottom layer 212 typically is non-magnetic. Being non-magnetic, the smooth lower surface of the bottom layer 212 does not pick-up or attract magnetic materials, such as pieces of metal or the like that might otherwise scratch the car if it ended up below the lower surface.

The bottom layer 212 also provides a barrier between the rigid layer 210 and the surface of the automobile. It has been noted that certain rigid layer materials (e.g., vinyl), if placed in contact with the surface of an automobile, could melt and cause discoloration and staining of the surface. The presence of the bottom layer, in some implementations, can prevent this problem.

Figure 5:
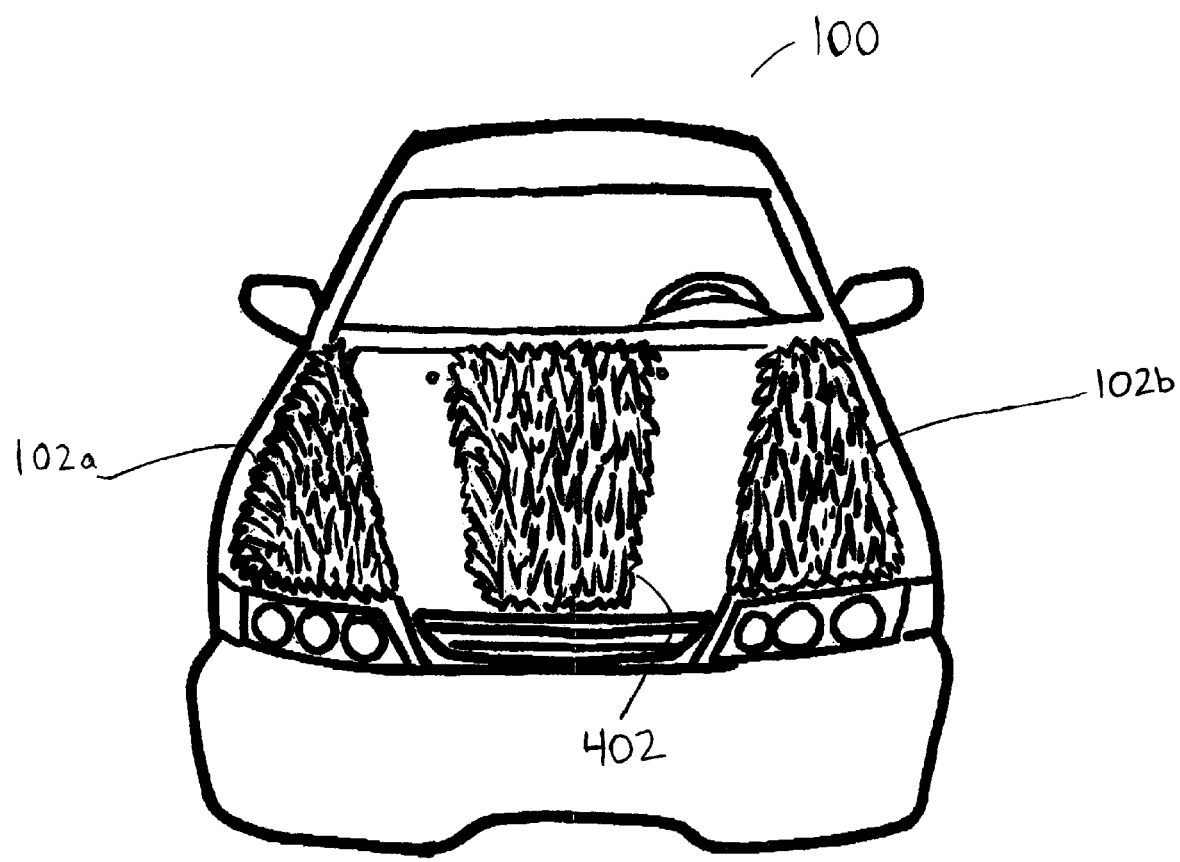
FIG. 5 is a perspective view of an automobile with exemplary ornaments attached to its hood.

FIG. 5 is a perspective view of the automobile 100 of FIG. 1 with an additional ornament 402 that partially covers a center portion of the hood.

The centrally-positioned ornament 402 of FIG. 5 is substantially similar to the ornament discussed above (i.e., ornament 102), however, the centrally-positioned ornament 402 of FIG. 5 includes two unsecured sides. The sides of the centrally-positioned ornament 402, therefore, include no tuck flaps. Fastening elements are provided only at the upper side (near the windshield) and the lower side (near the grill).

Moreover, since there are two unsecured sides, in a typical implementation, there are two weighted elements, one near each unsecured side.

A number of embodiments of the invention have been described. Nevertheless, it will be understood that various modifications may be made without departing from the spirit and scope of the invention.

For example, a variety of materials, beyond those explicitly mentioned herein, can be used for the various components of the ornament. The style, shape, color, etc. of the ornaments can vary greatly.

The fastening elements used can vary in type and arrangement. Additionally, the fastening elements can be adhered to other layers, such as the lower foam layer or to the rigid layer. Moreover, each side of an ornament may include any number or any combination of fastening elements.

Some implementations include a fastening element that includes a strap (e.g., a metallic strap) secured (by an adhesive material, or with a pin or the like) to the body of the ornament. The strap can have a series of holes. Twine or other stringy material can be tied (or otherwise secured) to the strap, for example, through one or more of the holes. A hook (e.g., a metallic or rubber hook) can be secured to a distal end of the twine. In such implementations, the hook would be adapted to engage a feature under the vehicle's hood, trunk, or other surface.

In some implementations, such as in an implementation that is intended to cover an entire hood of an automobile, a fastening element (or fastening elements) may be provided on every side of ornament. Moreover, since such an implementation would have no unsecured sides, the weighted element that normally is placed near the unsecured sides may be dispensed with.

The shape of the weighted element can vary considerably. For example, instead of being E-shaped, the weighted element could be F-shaped, L-shaped, O-shaped or have any other shape. In addition, the weighted element could be substantially rectangular or square.

Any number of t-pins or other securing devices may be provided to help hold the upper and lower foam layers together. In some implementations, no such securing devices may be provided and, instead, the upper and lower foam layers may be held together using only an adhesive material. Additionally, in some implementations, the upper and lower foam layers may be held together simply by virtue of the top layer and rigid layer pushing the upper and lower foam layers together.

The arrangement of layers relative to one another may be changed. Additionally, in certain implementations, one or more of the layers may be dispensed with entirely.

The ornaments may be provided for use with any kind of moving object including, for example, other vehicles, such as boats, helicopters, planes, bicycles, motorcycles, etc. Moreover, the ornament can be sized and shaped to fit over any part of a vehicle (e.g., the front hood or the trunk of a vehicle). Indeed, ornaments may be sold as sets that include, for example, matching or complementary ornaments—one for a vehicle's hood and the other for a vehicle's trunk. A variety of possible combinations are possible.

Other implementations are within the scope of the claims.

What is claimed is:

1. An apparatus comprising:
a top layer with an upper surface that is decorative;
a substantially planar upper foam layer beneath and coupled to the top layer;
a substantially planar lower foam layer beneath the upper foam layer;
fastening members coupled to at least one of the upper or lower foam layer and extended outward from at least a first edge and a second edge of the upper or lower foam layer, each fastening member adapted to engage a respective portion of a vehicle's body to hold the apparatus in place;

a weighted element between the upper and lower foam layers and proximate a third edge of the upper or lower foam layers, wherein the fastening members do not extend outward from the third edge;

a substantially rigid element beneath the lower foam layer and coupled to the top layer at peripheral edges thereof;

a substantially smooth bottom layer coupled to a lower surface of the substantially rigid element; and a securing device extended through the upper and lower foam layers and configured to urge the upper and lower foam layers towards one another, wherein the securing device does not extend through the top layer.

2. The apparatus of claim 1 adapted to be fastened to an outer surface of the vehicle.

3. The apparatus of claim 1 wherein the upper and lower foam layers respectively comprise substantially stiff plastic material having voids.

4. The apparatus of claim 3 wherein the plastic material is selected from a group consisting of: polyurethane, polyvinylchloride and polyester.

5. The apparatus of claim 1 wherein the substantially smooth bottom layer is a fusible interface, heat-fused to the substantially rigid layer.

6. The apparatus of claim 1 wherein the weighted element comprises:

a first portion substantially parallel to the edge of the foam layer that does not include the fastening member; and a second portion that extends perpendicularly from the first portion substantially toward an edge of the foam layer opposite the edge that does not include the fastening member.

7. The apparatus of claim 1 wherein the weighted element material is selected from the group consisting of: metal, wood and plastic.

8. The apparatus of claim 1 wherein the weighted element is sized and positioned so that, when the apparatus is coupled to the vehicle, the contours of the weighted element substantially follow the contours of the automobile beneath the apparatus.

9. The apparatus of claim 1 wherein the substantially smooth bottom layer is a fusible material that is non-magnetic.

10. The apparatus of claim 1 wherein the fastening elements include one or more elements selected from: tuck flaps, hanger strapping, nylon, wire cable, hooks and loop and hook.

11. The apparatus of claim 1 wherein the top layer comprises textured material that extends vertically out of a horizontal plane of the decorative upper surface.

12. The apparatus of claim 1 wherein the apparatus is adapted to be secured to a vehicle in such a manner that the vehicle can be driven without substantial obstruction of the driver's view.

13. The apparatus of claim 1 wherein the apparatus's weight, rigidity and tension contribute to its stability on the surface of an automobile.

14. An apparatus adapted to be fastened to an outer surface of a vehicle, the apparatus comprising:

a top layer with an upper surface that is decorative;

a substantially planar upper foam layer beneath and coupled to the top layer;

a substantially planar lower foam layer beneath the upper foam layer;

a weighted element between the upper and lower foam layers;

fastening members coupled to at least one of the upper or lower foam layer and extended outward from at least a first edge and a second edge of the upper or lower foam layer, each fastening member adapted to engage a respective portion of a vehicle's body to hold the apparatus in place; and a securing device extended through the upper foam layer and the lower foam layer to urge the upper foam layer and the lower foam layer towards one another, wherein the securing device does not extend through the top layer and is a t-pin, and wherein the apparatus's weight plus rigidity plus tension contribute to its stability on the outer surface of the vehicle.

15. The apparatus of claim 14 further comprising:

a substantially rigid layer beneath the lower foam layer; and a substantially non-magnetic, fusible interface beneath and heat-fused to the lower foam layer.

16. The apparatus of claim 15 wherein the first and second foam layers comprise substantially stiff plastic material having voids, and wherein the plastic material is selected from: polyurethane, polyvinylchloride and polyester.

17. The apparatus of claim 15 wherein the weighted element comprises:

a first portion extended substantially parallel to the edge of the foam layer that does not include the fastening member; and a second portion that extends perpendicularly from the first portion substantially toward an edge of the foam layer opposite the edge that does not include the fastening member.

18. The apparatus of claim 14 wherein the weighted element between the upper and lower foam layers is proximate an edge of the upper and lower foam layers that does not include a fastening member.

* * * * *